(12) United States Patent
Moon et al.

(10) Patent No.: US 11,460,979 B2
(45) Date of Patent: Oct. 4, 2022

(54) DISPLAY DEVICE FOR PROCESSING USER UTTERANCE AND CONTROL METHOD OF DISPLAY DEVICE

(71) Applicant: SAMSUNG ELECTRONICS CO., LTD., Suwon-si (KR)

(72) Inventors: Jibum Moon, Suwon-si (KR); Jina Kwon, Suwon-si (KR); Kyerim Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/756,674

(22) PCT Filed: Dec. 28, 2018

(86) PCT No.: PCT/KR2018/016900
§ 371 (c)(1),
(2) Date: Apr. 16, 2020

(87) PCT Pub. No.: WO2019/132609
PCT Pub. Date: Jul. 4, 2019

(65) Prior Publication Data
US 2020/0285363 A1    Sep. 10, 2020

(30) Foreign Application Priority Data
Dec. 29, 2017    (KR) ........................ 10-2017-0184791

(51) Int. Cl.
*G06F 3/00*    (2006.01)
*G06F 3/0484*    (2022.01)
(Continued)

(52) U.S. Cl.
CPC ............ *G06F 3/0484* (2013.01); *G06F 3/167* (2013.01); *G10L 15/22* (2013.01)

(58) Field of Classification Search
None
See application file for complete search history.

(56) References Cited

U.S. PATENT DOCUMENTS 10,191,613 B2    1/2019    Kwon et al.
10,331,334 B2    6/2019    Paek et al.
(Continued)

FOREIGN PATENT DOCUMENTS

KR    10-2014-0111538    9/2014
KR    10-2014-0137263    12/2014
(Continued)

OTHER PUBLICATIONS

International Search Report for PCT/KR2018/016900 dated Apr. 17, 2019, 5 pages.
(Continued)

*Primary Examiner* — Michael A Faragalla
(74) *Attorney, Agent, or Firm* — Nixon & Vanderhye, P.C.

(57) ABSTRACT

According to an embodiment disclosed in the specification, a display device may include a microphone, a display displaying a screen including a plurality of layers, a memory storing a plurality of application programs, and at least one processor displaying a first user interface (UI) for interacting with a user on a first layer among the plurality of layers, displaying a second UI for displaying information obtained by performing the interaction on a second layer among the plurality of layers, and displaying an image at least partly overlapping with the first UI and the second UI on a third layer among the plurality of layers.

12 Claims, 14 Drawing Sheets

(51) Int. Cl.
 *G06F 3/16* (2006.01)
 *G10L 15/22* (2006.01)

(56) References Cited

U.S. PATENT DOCUMENTS

| | | | |
|---|---|---|---|
| 2009/0253463 A1* | 10/2009 | Shin | H04M 1/72469 |
| | | | 704/E15.001 |
| 2012/0274574 A1* | 11/2012 | Aono | G06F 3/0488 |
| | | | 345/173 |
| 2015/0347461 A1 | 12/2015 | Moon et al. | |
| 2015/0382047 A1 | 12/2015 | Van Os et al. | |
| 2016/0212488 A1* | 7/2016 | Os | H04N 21/4312 |
| 2017/0046062 A1 | 2/2017 | Lee et al. | |
| 2017/0068670 A1* | 3/2017 | Orr | G06F 16/48 |
| 2017/0230709 A1 | 8/2017 | Van Os et al. | |

FOREIGN PATENT DOCUMENTS

| | | |
|---|---|---|
| KR | 10-2015-0115169 | 10/2015 |
| KR | 10-2015-0136312 | 12/2015 |
| KR | 10-2016-0105240 | 9/2016 |
| KR | 10-2017-0019808 | 2/2017 |

OTHER PUBLICATIONS

Written Opinion of the ISA for PCT/KR2018/016900, dated Apr. 17, 2019, 6 pages.

Office Action dated May 23, 2022 in Korean Application No. 10-2017-0184791 and English-language translation.

* cited by examiner

DISPLAY DEVICE FOR PROCESSING USER UTTERANCE AND CONTROL METHOD OF DISPLAY DEVICE

This application is the U.S. national phase of International Application No. PCT/KR2018/016900 filed 28 Dec. 2018, which designated the U.S. and claims priority to KR Patent Application No. 10-2017-0184791 filed 29 Dec. 2017, the entire contents of each of which are hereby incorporated by reference.

FIELD

Embodiments disclosed in the disclosure refer to a technology for processing a user utterance.

DESCRIPTION OF RELATED ART

In addition to a conventional input method using a keyboard or a mouse, electronic devices have recently supported various input methods such as a voice input and the like. For example, the electronic devices such as smart phones or tablet PCs may receive a user voice and then may provide a service that performs an operation corresponding to the received user voice. The speech recognition service is being developed based on a technology for processing a natural language.

Besides, the electronic devices may provide a feedback corresponding to a user utterance and then may receive a user input corresponding to the feedback, thereby providing a service desired by a user.

SUMMARY

A display device may display both a UI for receiving a user utterance and a screen for displaying a result of processing the user utterance on a display, when processing a function corresponding to the received user utterance. Accordingly, the display device may only process the user utterance associated with the first entered user utterance intermittently; it may also be difficult to provide a feedback on the received user input. In other words, it may be difficult for the display device to organically process a plurality of user inputs associated with one another.

According to various embodiments of the disclosure, the display device may organically process user utterances associated with one another through interaction with a user.

According to an embodiment disclosed in the specification, a display device may include a microphone, a display displaying a screen including a plurality of layers, a memory storing a plurality of application programs, and at least one processor displaying a first user interface (UI) for interacting with a user on a first layer among the plurality of layers, displaying a second UI for displaying information obtained by performing the interaction on a second layer among the plurality of layers, and displaying an image at least partly overlapping with the first UI and the second UI on a third layer among the plurality of layers. The at least one processor may be configured to display the first UI on the display, in a process of performing the interaction through the microphone and in a process of displaying a result of performing the interaction on at least one of the second UI and the third layer.

Furthermore, according to an embodiment disclosed in the specification, a method may include displaying a first UI for interacting with a user on a first layer among a plurality of layers included in a screen displayed on a display, receiving a first user input through a microphone, and displaying a result corresponding to the first user input, on a second UI for displaying information obtained by performing the interaction on a second layer among the plurality of layers or on a third layer on which an image at least partly overlapping with the first UI and the second UI is displayed.

Furthermore, according to an embodiment disclosed in the specification, a program for executing a method may be recorded in a recording medium. The method may include displaying a first UI for interacting with a user on a first layer among a plurality of layers included in a screen displayed on a display, receiving a first user input through a microphone, and displaying a result corresponding to the first user input, on a second UI for displaying information obtained by performing the interaction on a second layer among the plurality of layers or on a third layer on which an image at least partly overlapping with the first UI and the second UI is displayed.

According to embodiments disclosed in the specification, in the process of performing a specified function depending on a user utterance, a display device may display a UI for interacting with a user and a UI for displaying a result of performing the specified operation on a plurality of layers. Accordingly, the display device may organically process a plurality of user utterances associated with one another while minimizing the obscuration of the image of content, and may provide the user with a user experience, such as talking to the display device.

Besides, a variety of effects directly or indirectly understood through the disclosure may be provided.

BRIEF DESCRIPTION OF THE DRAWINGS

With regard to description of drawings, the same or similar components may be marked by the same or similar reference numerals.

DETAILED DESCRIPTION OF EXAMPLE EMBODIMENTS

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure. With regard to description of drawings, similar components may be marked by similar reference marks/numerals.

Figure 1:
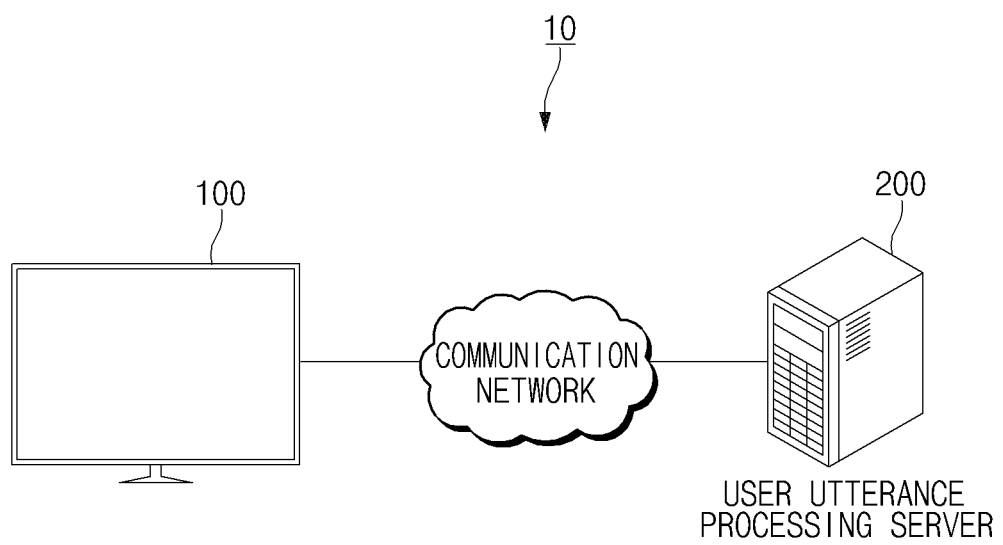
FIG. 1 is a diagram illustrating a user utterance processing system according to various embodiments.

FIG. 1 is a diagram illustrating a user utterance processing system according to various embodiments.

Referring to FIG. 1, a user utterance processing system 10 may include a display device 100 and a user utterance processing server 200. The display device 100 and the user utterance processing server 200 may be connected over a communication network.

According to an embodiment, the display device 100 may provide content to a user. For example, the display device 100 may provide the content to the user by respectively outputting an image and a sound included in the content through a display and a speaker. According to an embodiment, the user utterance processing system 10 may output the content stored in a memory or the content received from an external device.

According to an embodiment, the display device 100 may display a user interface (UI) for providing information, on the display. For example, the display device 100 may display a UI for receiving a user utterance on the display. For another example, the display device 100 may display the result of executing a specified operation on the UI. For example, the UI may be displayed on an image of the content displayed on the display. In other words, at least part of the UI may be displayed while overlapping with the image of the content.

According to an embodiment, the display device 100 may provide a specified service to the user. For example, the display device 100 may provide the specified service to a user through the installed application program (or app). In other words, the display device 100 may execute an app and then may provide a service corresponding to a user input through the executed app.

According to an embodiment, the display device 100 may receive a user utterance for performing a specified function. According to an embodiment, the display device 100 may process the received user utterance to provide the specified service to the user. According to an embodiment, the display device 100 may process the received user utterance through the user utterance processing server 200. For example, the display device 100 may transmit the received user utterance to the user utterance processing server 200 and then may receive information (e.g., a path rule) for performing the specified function from the user utterance processing server 200.

According to an embodiment, the user utterance processing server 200 may process the user utterance. For example, the user utterance processing server 200 may receive a user utterance from the display device 100, may process the received utterance, and may transmit the processed utterance to the display device 100.

According to an embodiment, the user utterance processing server 200 may process the received user utterance. According to an embodiment, the user utterance processing server 200 may include an auto speech recognition module (or ASR module) for converting a user utterance to a text and a natural language understanding module (or NLU module) for determining the intent of the user utterance.

According to an embodiment, the ASR module may generate a text corresponding to the received user utterance. According to an embodiment, the NLU module may analyze the generated text to determine a function corresponding to the user utterance. For example, the NLU module may analyze the text to grasp the user's intent and may determine the function to be executed depending on the intent. In addition, the NLU module may extract a parameter needed to perform the determined function from the text. Accordingly, the user utterance processing server 200 may generate (or select) information (e.g., a path rule) including the determined function and the extracted parameter.

The display device 100 may process the intermittently received user utterance. For example, the display device 100 may receive a user input and may provide the result of performing a function corresponding to the received user input. In other words, the display device 100 may display both a UI for receiving a user utterance and the result of processing the user utterance on the display. Accordingly, when the display device 100 performs a function corresponding to the received user utterance, it may be difficult to organically provide a feedback on the received user utterance. In addition, to execute an additional function associated with the first entered user utterance, the user may have the inconvenience of re-entering information included in the first entered user utterance. The display device 100 according to various embodiments of the disclosure may perform a specified function in a dialog form through the organic interaction with a user.

Figure 2:
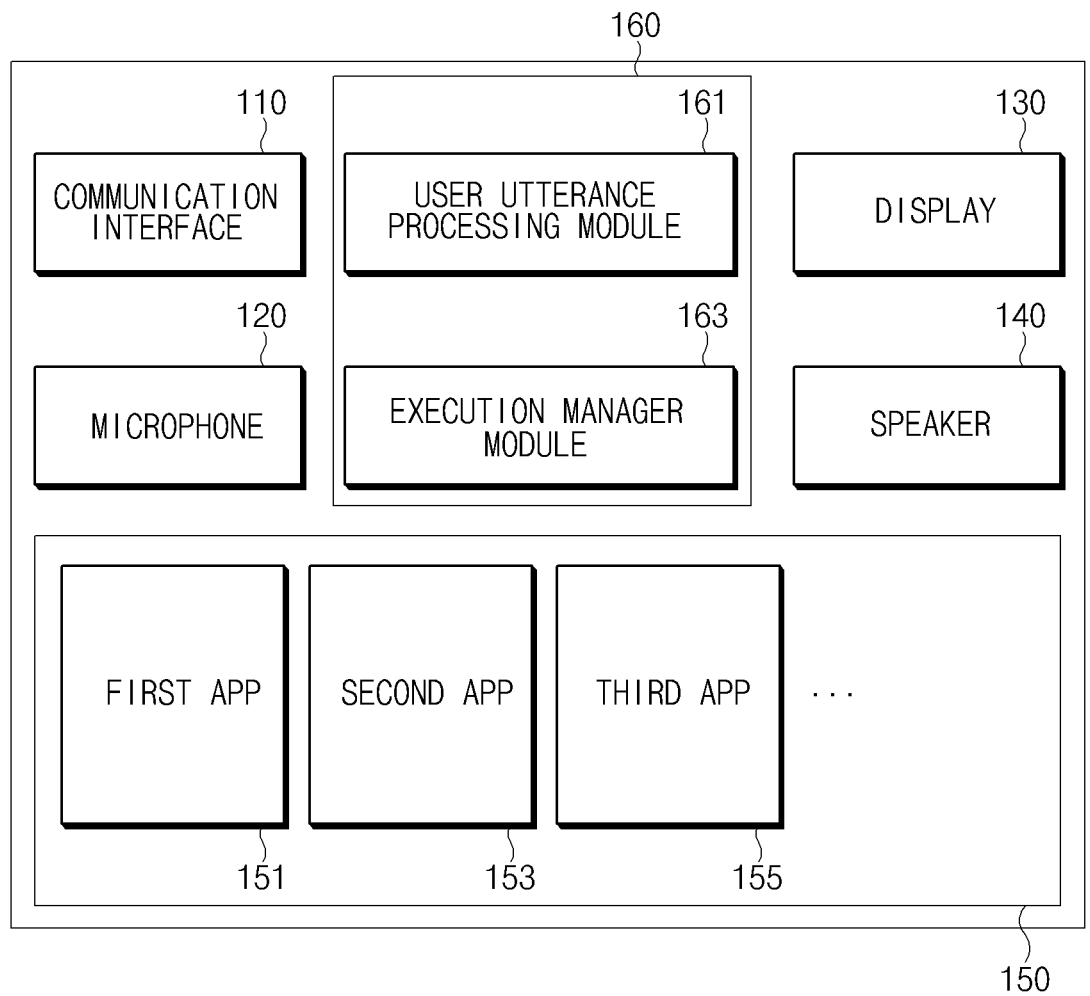
FIG. 2 is a block diagram illustrating a configuration of a display device according to various embodiments of the disclosure.

FIG. 2 is a block diagram illustrating a configuration of a display device according to various embodiments of the disclosure.

Referring to FIG. 2, the display device 100 may include a communication interface 110, a microphone 120, a display 130, a speaker 140, a memory 150, and a processor 160.

According to an embodiment, the communication interface 110 may be connected to an external device to communicate with the external device. For example, the communication interface 110 may be connected to the user utterance processing server 200 to transmit a user utterance to the user utterance processing server 200. According to an embodiment, the communication interface 110 may include a wired communication interface and a wireless interface. For example, the wired communication interface (e.g., High-Definition Multimedia Interface (HDMI), digital visual interface (DVI) interface, video graphics array (VGA) interface, or the like) may be connected to the external device such as a set-top box, a digital versatile disc (DVD) player, and the like via a wire to receive content. The wireless communication interface may be connected to the user utterance processing server 200 through an access point (AP) to process the user utterance.

According to an embodiment, the microphone 120 may receive the user utterance from a user. For example, the microphone 120 may receive the user utterance through a speech input system. In this specification, the user utterance may be referred to as a voice signal.

According to an embodiment, the display 130 may display an image (or a video image). For example, the display 130 may display the image of content. For another example, the display 130 may display the user interface (UI) of the executed app. For example, the UI may be a graphic user interface (GUI).

According to an embodiment, the speaker 140 may output sound. For example, the speaker 140 may output the sound of content. For another example, the speaker 140 may output voice sound. For example, the voice sound may be a feedback voice corresponding to a user input.

According to an embodiment, the memory 150 may include a plurality of apps 151, 153, and 155. For example, the plurality of apps 151, 153, and 155 may be programs for performing a function corresponding to the user input. (including volatile and non-volatile memory)

According to an embodiment, the first app 151 may be an app for providing the specified content. For example, the first app 151 may provide video on demand (VOD) corresponding to a user input. According to an embodiment, the second app 153 may be an app for obtaining the specified information. For example, the second app 153 may obtain information about the result of a sport game, local weather information, and the like. According to an embodiment, the third app 155 may be an app for purchasing a product, or the like. For example, a user may book travel products or may order food, through the third app 155.

According to an embodiment, the processor 160 may be operatively connected to the communication interface 110, the microphone 120, the display 130, the speaker 140, and the memory 150 to control the overall operation of the display device 100.

According to an embodiment, the processor 160 may output content. For example, the processor 160 may output images and sound, which are included in the content received from the external device through the communication interface 110, through the display 130 and the speaker 140, respectively. According to an embodiment, the processor 160 may output content corresponding to a user input.

According to an embodiment, the processor 160 may display a UI for providing information on the display 130. For example, the processor 160 may display a UI for interacting with a user. In addition, the processor 160 may provide a feedback or a result (or information) corresponding to a user utterance.

According to an embodiment, the processor 160 may display a screen including a plurality of layers on the display 130. For example, the processor 160 may display a UI for interacting with a user, a UI for displaying information obtained by performing the interaction, a UI for displaying the feedback on a user input, and the image of content, on the plurality of layers, respectively.

According to an embodiment, the processor 160 may compose the UI for interacting with a user, the UI for displaying information obtained by performing the interaction, the UI for displaying the feedback on a user input, and the image of content, which are respectively displayed on the plurality of layers, and then may display the composed result on the display 130. Accordingly, for example, the UI for interacting with a user, the UI for displaying information obtained by performing the interaction, and the UI for displaying the feedback on a user input, which are respectively displayed on the plurality of layers, may be displayed in a specified region of a screen on which the image of content is displayed.

According to an embodiment, the processor 160 may include a user utterance processing module 161 and an execution manager module 163.

According to an embodiment, the user utterance processing module 161 may process the user utterance (or the first user utterance) received through the microphone 120. For example, the user utterance processing module 161 may transmit the received user utterance to the user utterance processing server 200 and may receive information for performing a function corresponding to the user utterance from the user utterance processing server 200. In other words, the user utterance processing module 161 may process the user utterance through the user utterance processing server 200.

According to an embodiment, the user utterance processing module 161 may provide the feedback on the received user utterance. For example, when the user utterance includes information insufficient to execute the specified function, the user utterance processing module 161 may provide the feedback on the user utterance. For example, the feedback may include an input request for the insufficient information. According to an embodiment, the user utterance processing module 161 may receive the user utterance (or the second user utterance) corresponding to the feedback. The user utterance processing module 161 may process the received user utterance.

According to an embodiment, the processor 160 may display a UI (or the first UI) for interacting with a user in one layer (or the first layer) among a plurality of layers included in the screen displayed on the display 130. For example, the interaction may include a user utterance and a feedback. According to an embodiment, the processor 160 may display an indicator for indicating the state of the user utterance processing module 161 on the UI. For example, when the user utterance processing module 161 is receiving a user utterance, the processor 160 may display the indicator in the first state (e.g., blue). When the user utterance processing module 161 provides a feedback, the processor 160 may display the indicator in the second state (e.g., white). Accordingly, the user may recognize a process of the interaction through the indicator.

According to an embodiment, the processor 160 may display a UI (or the second UI) for outputting the feedback in one layer (or the second layer) among the plurality of layers included in the screen displayed on the display 130. According to an embodiment, the processor 160 may output the feedback through the speaker 140. In other words, the processor 160 may output the same content as the feedback output through the UI.

According to an embodiment, the processor 160 may execute a function corresponding to the user utterance processed through the user utterance processing module 161. For example, the processor 160 may display the image of content corresponding to the processed user utterance in one layer (or the third layer) of the plurality of layers included in the screen displayed on the display 130. For example, the user utterance may be an input for changing a channel. For another example, the user utterance may be an input for outputting the specified content. For another example, the processor 160 may transmit information about the user utterance processed through the user utterance processing module 161 to the execution manager module 163.

According to an embodiment, the execution manager module 163 may perform the specified function, using the information received from the user utterance processing module 161. According to an embodiment, the execution manager module 163 may select at least one of a plurality of apps stored in the memory 150 based on the information and may execute the selected app to perform the specified function. For example, the specified function may be a function corresponding to a user input.

According to an embodiment, the processor 160 may display a UI (or the third UI) for displaying the result of the function performed by the execution manager module 163, in one layer (or the fourth layer) of the plurality of layers included in the screen displayed on the display 130. For example, the processor 160 may obtain information by performing a function corresponding to the user utterance and then may display the obtained information on a UI for displaying the result of the function performed by the execution manager module 163. According to an embodiment, the processor 160 may display the UI (or the fourth UI) of an application executed to perform a function corresponding to a user input in one layer (or the third layer) of the plurality of layers included in the screen displayed on the display 130. For example, the processor 160 may display the UI of an application executed to perform a function corresponding to a user input in the layer where the image of the content is displayed, instead of the image of the content.

According to an embodiment, the processor 160 may receive the first user utterance through the microphone 120. The processor 160 may process the received first user utterance. For example, the processor 160 may transmit a user utterance to the user utterance processing server 200 through the communication interface 110 and may receive information for executing a function corresponding to the user utterance. According to an embodiment, the processor 160 may display the result corresponding to the first user utterance on the display 130, using the received information. For example, the processor 160 may display the result in one layer (e.g., the second UI, which is displayed in the second layer, or the third layer) of the plurality of layers.

According to an embodiment, in the process of performing the interaction through the microphone 120 and in the process of displaying the result of the interaction on one layer of a plurality of layers, the processor 160 may display a UI for performing the interaction on the display 130. In other words, in the process of processing a user utterance, the processor 160 may display a UI for performing interaction with a user. Accordingly, the user may continuously enter a user input necessary for the display device 100 to operate.

According to an embodiment, the display device 100 may provide the user with a user experience (UX) in a conversational form by receiving the feedback on the received user utterance and the user input corresponding to the feedback.

Figure 3:
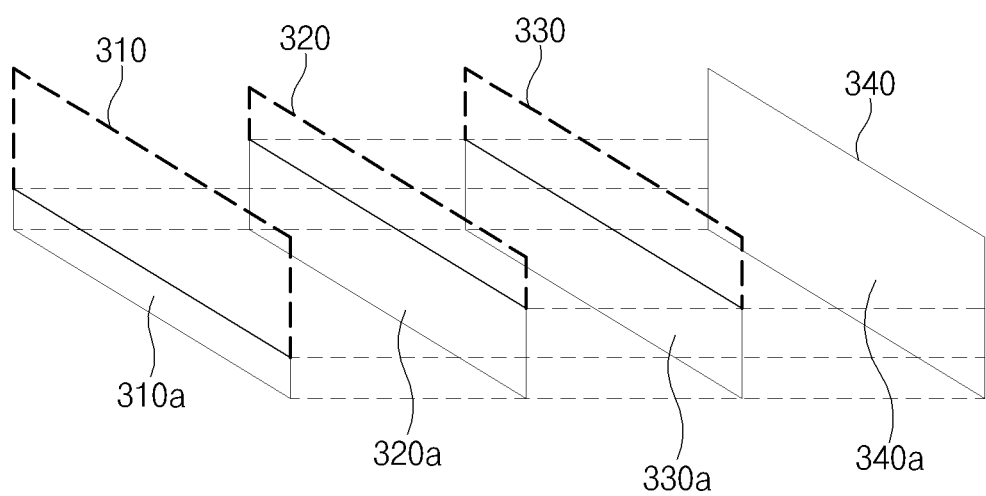
FIG. 3 is a view illustrating a plurality of layers of a screen displayed on a display according to various embodiments of the disclosure.

FIG. 3 is a view illustrating a plurality of layers of a screen displayed on a display according to various embodiments of the disclosure.

Referring to FIG. 3, the display device 100 may display a screen including a plurality of layers on a display. For example, the plurality of layers may include a first layer 310, a second layer 320, a third layer 330, and a fourth layer 340.

According to an embodiment, the display device 100 may display a first UI 310a (e.g., the first UI of FIG. 2) for interacting with a user on the first layer 310 among a plurality of layers. For example, the first UI 310a may be displayed in a partial region of the first layer 310. According to an embodiment, the display device 100 may display an indicator indicating the state of the display device 100 on the first UI 310a. Besides, the display device 100 may display the received user utterance and a reply to the user utterance, in the first UI 310a.

According to an embodiment, the display device 100 may display a second UI 320a (e.g., the second UI of FIG. 2) for displaying the feedback on a user input, on the second layer 320 (e.g., the second layer of FIG. 2) among the plurality of layers. For example, the second UI 320a may be displayed in a partial region of the second layer 320. For example, the feedback may include at least one object capable of being selected depending on a user input. According to an embodiment, the display device 100 may receive a user input for a feedback through a microphone. For example, the user input may be an input to select one of at least one object capable of being selected.

According to an embodiment, the display device 100 may display a third UI 330a (e.g., the third UI of FIG. 2) for displaying information obtained by performing interaction with a user, on the third layer 330 (e.g., the fourth layer of FIG. 2) among the plurality of layers. For example, the third UI 330a may be displayed in a partial region of the third layer 330. According to an embodiment, the display device 100 may obtain information through an application for performing a function corresponding to a user input and may display the obtained information on the third UI 330a. According to an embodiment, the display device 100 may display an image 340a on the fourth layer 340 (e.g., the third layer of FIG. 2) among the plurality of layers. For example, the image 340a may include an image of content or the fourth UI (e.g., the fourth UI of FIG. 3) of the executed application.

According to an embodiment, the display device 100 may display the sequentially stacked first layer 310 to fourth layer 340 on a display. In other words, the display device 100 may display the first to fourth layers 310 to 340 on the display based on the stacked order. For example, the first UI 310a, the second UI 320a, and the third UI 330a respectively displayed on the first to third layers 310 to 330 may be displayed to be superimposed with the content image 340a in a specified region of the screen on which the content image 340a displayed on the fourth layer 340 is displayed. The first UI 310a, the second UI 320a, and the third UI 330a displayed to be superimposed on the screen may be displayed with a specified transparency on a screen where the content image 340a is displayed as a whole. According to an embodiment, the display device 100 may selectively display the second layer 320 and the fourth layer 340 on the display.

Figure 4:
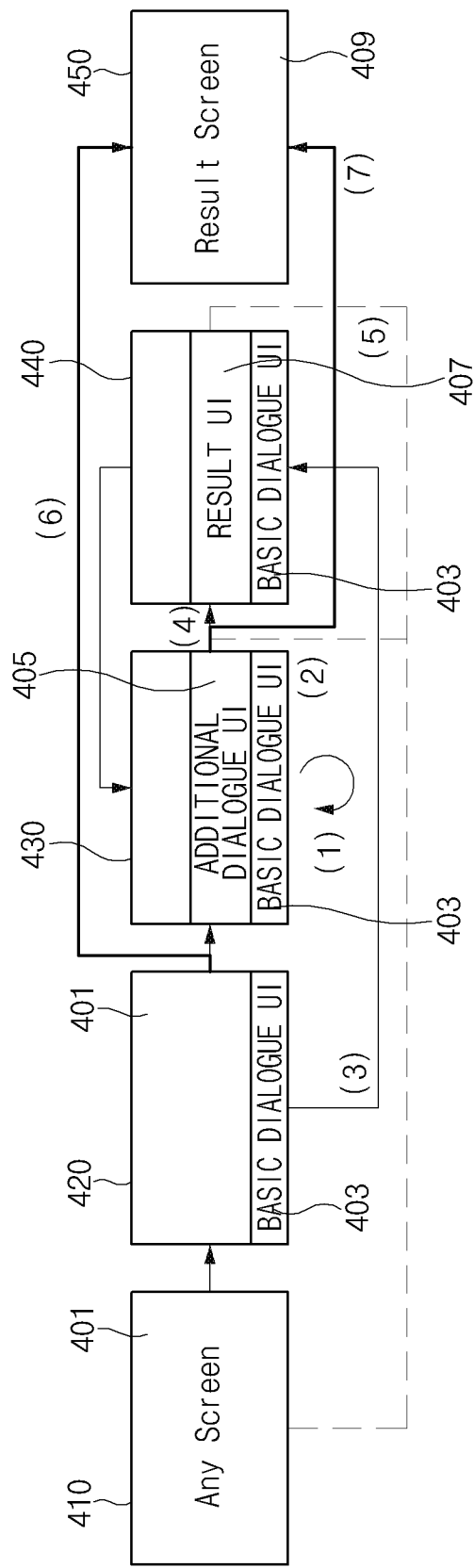
FIG. 4 is a diagram illustrating a method in which a display device displays a screen including a plurality of layers on a display, according to various embodiments.

FIG. 4 is a diagram illustrating a method in which a display device displays a screen including a plurality of layers on a display, according to various embodiments.

Referring to FIG. 4, the display device 100 may interact with a user and may display the result of the interaction on a display.

According to an embodiment, in screen 410, the display device 100 may display an image 401 on the display. For example, the image 401 may include the image of content or the UI of the executed app.

According to an embodiment, in screen 420, the display device 100 may display the image 401 and a first UI 403 for interacting with the user, on the display. For example, when the display device 100 receives a user input in screen 410, the display device 100 may display the first UI 403 on the display. For example, the first user input may be an input for performing a specified function. The first user input may be received via a microphone.

According to an embodiment, in screen 430, the display device 100 may display the image 401, the first UI 403, and a second UI 405 for displaying a feedback on the first user input, on the display. For example, when the display device 100 receives the first user input including information insufficient to perform the specified function in screen 420, the display device 100 may display the feedback on the first user input, on the second UI 405. For example, the feedback may be to obtain the result corresponding to the first user input. According to an embodiment, the display device 100 may receive a second user input associated with the feedback.

According to an embodiment, when a user input (e.g., the second user input) is insufficient to perform the specified function, the display device 100 may provide the user with a plurality of feedbacks on the user input received through the display. In other words, the display device 100 may provide the user with the plurality of feedbacks to perform the specified function (1). According to an embodiment, when it is difficult to perform the specified function through the feedbacks, the display device 100 may display the image on the display to be the same as screen 410 (2).

According to an embodiment, in screen 440, the display device 100 may display the image 401, the first UI 403, and a third UI 407 for displaying the result of performing the function corresponding to a user input, on the display. For example, in screen 420, the display device 100 may display the result of performing the function corresponding to the first user input, on the third UI 407 (3). For another example, in screen 430, the display device 100 may display the result of performing the function corresponding to the second user input, on the third UI 407 (4). According to an embodiment, when the display device 100 completes the provision of the result, the display device 100 may display an image on the display to be the same as screen 410 (5). According to an embodiment, the display device 100 may display information obtained through app for performing a function corresponding to a user input, on the third UI 407.

According to an embodiment, in screen 450, the display device 100 may display an image 409 corresponding to a user input on the display. For example, in screen 420, the display device 100 may display the image 409 corresponding to the first user input on the display (6). For another example, in screen 430, the display device 100 may display the image 409 corresponding to the second user input on the display (7). According to an embodiment, the display device 100 may display an image of content corresponding to a user input or the UI of an app capable of performing a function corresponding to the user input on the display.

Figure 5:
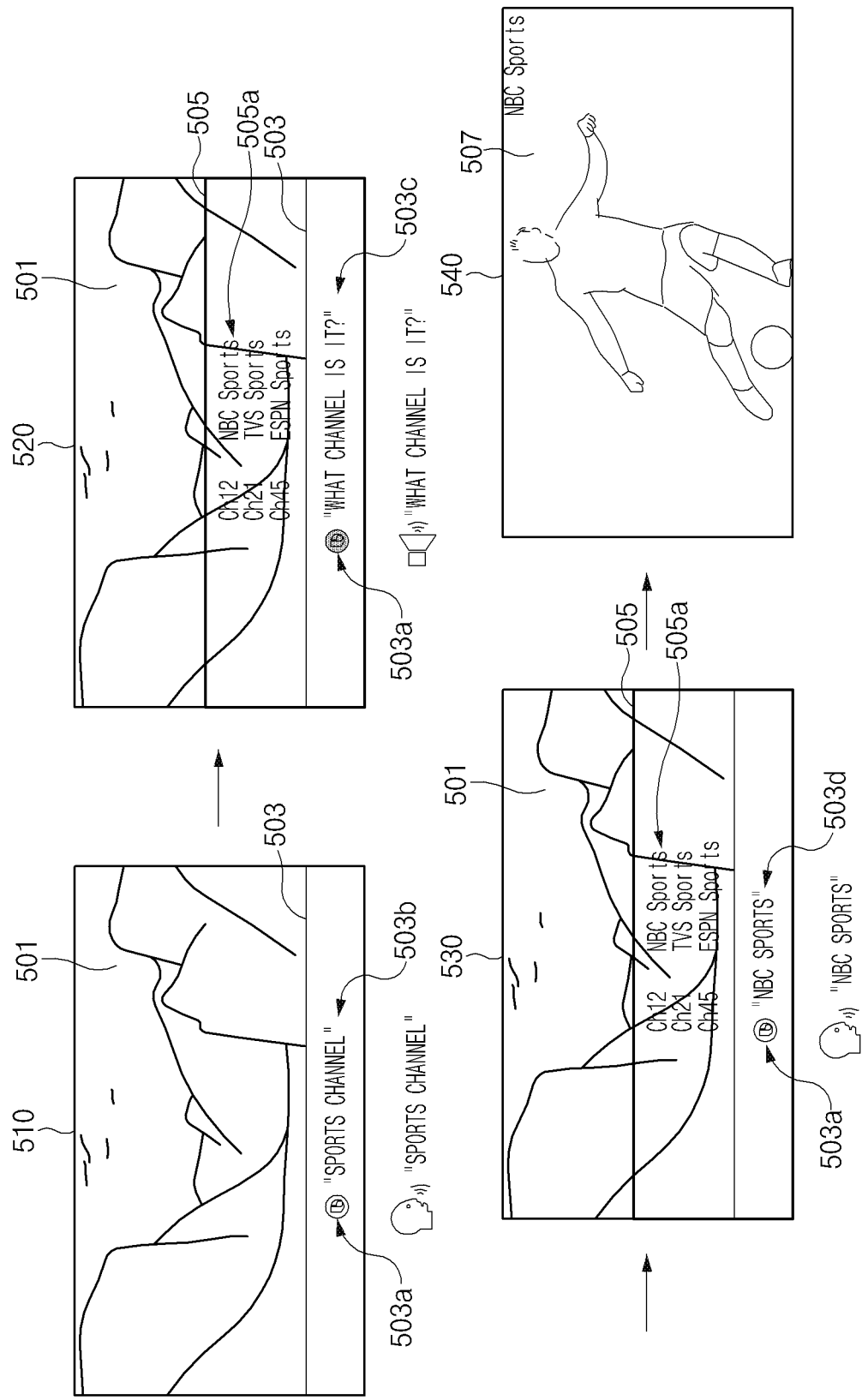
FIG. 5 is a screen in which a display device changes a channel depending on a user utterance, according to an embodiment.

FIG. 5 is a screen in which a display device changes a channel depending on a user utterance, according to an embodiment.

Referring to FIG. 5, the display device 100 may change a channel depending on a user utterance to change the image of content displayed on a display (e.g., the display 130 in FIG. 2).

According to an embodiment, in screen 510, the display device 100 may receive a first user input for changing a channel called "sports channel". For example, the first user input may include information insufficient to specify a channel. According to an embodiment, the display device 100 may display a first UI 503 (e.g., the first UI 310a in FIG. 3) for interacting with a user, on a screen on which an image 501 of content (e.g., the image 340a in FIG. 3) is displayed. For example, the image 501 of content may be displayed on the fourth layer (e.g., the fourth layer 340 in FIG. 3). The first UI 503 may be displayed on the first layer (e.g., the first layer 310 in FIG. 3). According to an embodiment, the display device 100 may display an indicator 503a indicating the state of receiving the first user input and a text 503b corresponding to the first user input (e.g., a user utterance), on the first UI 503. For example, the indicator 503a may be displayed in a first state (e.g., blue).

According to an embodiment, in screen 520, the display device 100 may display a second UI 505 (e.g., the second UI 320a in FIG. 3) for displaying a feedback on the first user input, on a screen on which the image 501 of content is displayed. According to an embodiment, the display device 100 may display a feedback 505a including a channel capable of being selected based on the first user input, on the second UI 505. The second UI 505 may be displayed on the second layer (e.g., the second layer 320 of FIG. 3). According to an embodiment, the display device 100 may display a text 503c for the reply of "What channel is it?" to the first user input on the first UI 503 and then may output the reply through a speaker. According to an embodiment, the display device 100 may display the indicator 503a for indicating a state of outputting the reply, on the first UI 503. For example, the indicator 503a may be displayed in a second state (e.g., white).

According to an embodiment, in screen 530, the display device 100 may receive a second user input called "NBC Sports" associated with the feedback 505a. According to an embodiment, the display device 100 may display the indicator 503a indicating the state of receiving the second user input and a text 503d corresponding to the second user input (e.g., a user utterance), on the first UI 503.

According to an embodiment, in screen 540, the display device 100 may output an image 507 of content of NBC sports channel corresponding to the second user input.

Figure 6:
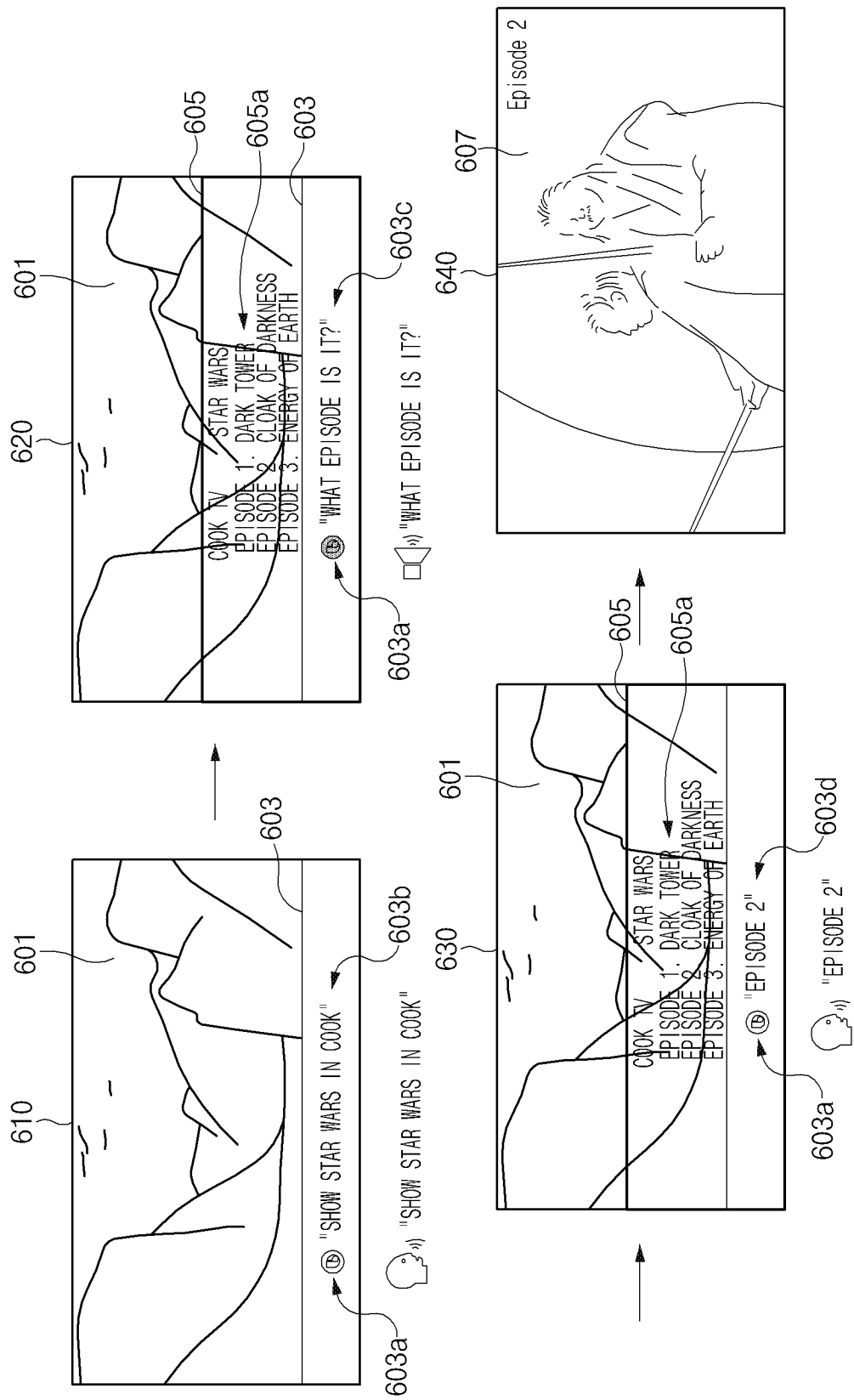
FIG. 6 is a screen on which a display device provides video on demand (VOD) depending on a user utterance, according to an embodiment.

FIG. 6 is a screen on which a display device provides video on demand (VOD) depending on a user utterance, according to an embodiment.

Referring to FIG. 6, the display device 100 may output VOD depending on a user utterance to change the image of content displayed on a display (e.g., the display 130 in FIG. 2).

According to an embodiment, in screen 610, the display device 100 may receive the first user input for playing the VOD of "Show Star Wars in COOK!". For example, the first user input may include information insufficient to specify an episode to be played. According to an embodiment, the display device 100 may display a first UI 603 (e.g., the first UI 310a in FIG. 3) for interacting with a user, on a screen on which an image 601 of content (e.g., the image 340a in FIG. 3) is displayed. According to an embodiment, the display device 100 may display an indicator 603a indicating the state of receiving the first user input and a text 603b corresponding to the first user input (e.g., a user utterance), on the first UI 603.

According to an embodiment, in screen 620, the display device 100 may display a second UI 605 (e.g., the second UI 320a in FIG. 3) for displaying a feedback on the first user input, on a screen on which the image 601 of content is displayed. According to an embodiment, the display device 100 may display a feedback 605a including an episode capable of being selected based on the first user input, on the second UI 605. According to an embodiment, the display device 100 may display a text 603c corresponding to the reply of "What episode is it?" to the first user input, on the first UI 603 and then may output the reply through a speaker. According to an embodiment, the display device 100 may display the indicator 603a for indicating a state of outputting the reply, on the first 603.

According to an embodiment, in screen 630, the display device 100 may receive a second user input called "Episode 2" associated with the feedback 605*a*. According to an embodiment, the display device 100 may display the indicator 603*a* indicating the state of receiving the second user input and a text 603*d* corresponding to the second user input (e.g., a user utterance), on the first UI 603.

According to an embodiment, in screen 640, the display device 100 may output an image 607 of content of "Star Wars Episode 2" corresponding to the second user input.

Figure 7:
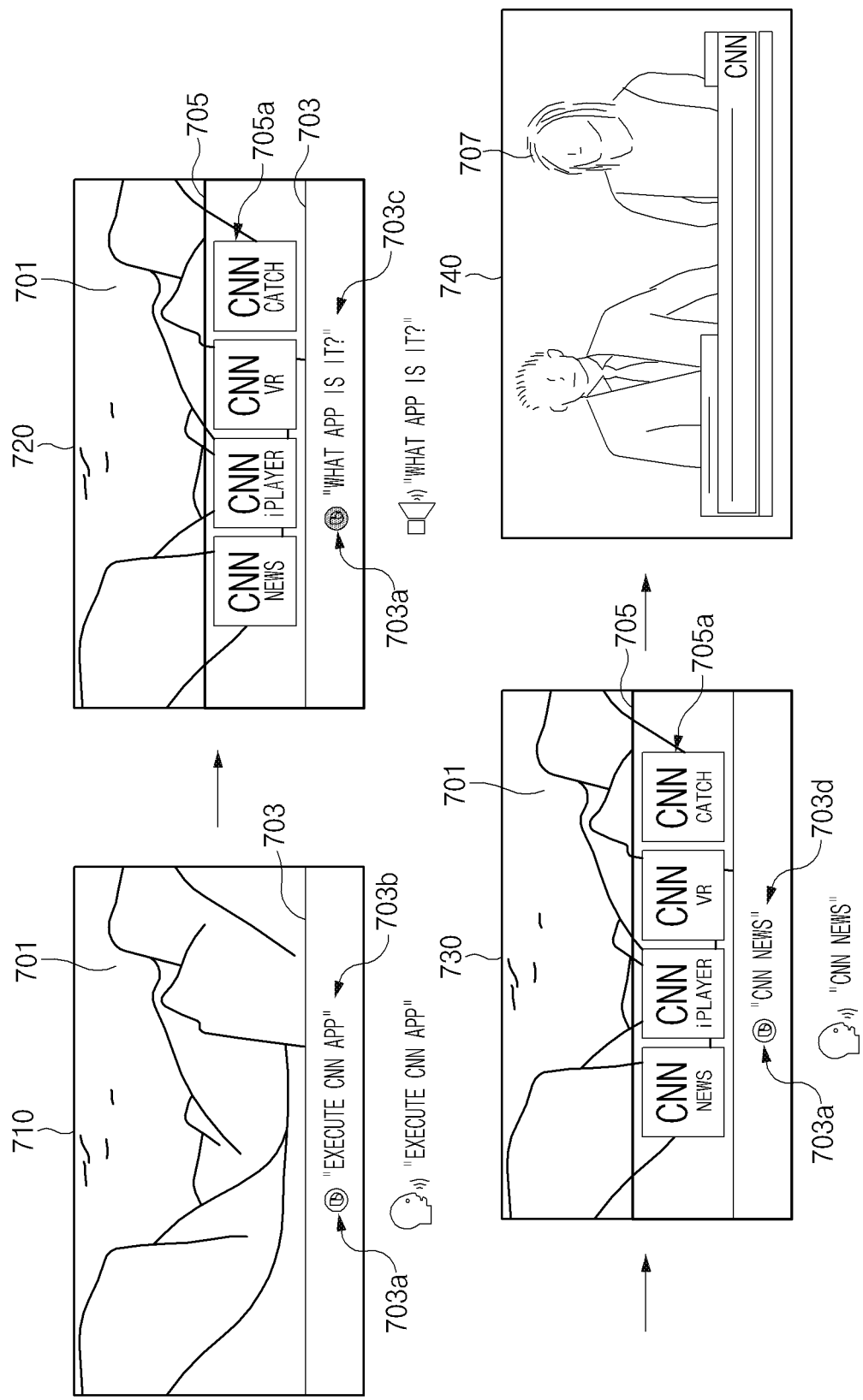
FIG. 7 is a screen on which a display device executes an app depending on a user utterance, according to an embodiment.

FIG. 7 is a screen on which a display device executes an app depending on a user utterance, according to an embodiment.

Referring to FIG. 7, the display device 100 may execute an app depending on a user utterance to change the image of content displayed on a display (e.g., the display 130 of FIG. 2).

According to an embodiment, in screen 710, the display device 100 may receive the first user input for executing the app of "Execute CNN app!". For example, the first user input may include information insufficient to specify an app to be executed. According to an embodiment, the display device 100 may display a first UI 703 (e.g., the first UI 310*a* in FIG. 3) for interacting with a user, on a screen on which an image 701 of content (e.g., the image 340*a* in FIG. 3) is displayed. According to an embodiment, the display device 100 may display an indicator 703*a* indicating the state of receiving the first user input and a text 703*b* corresponding to the first user input (e.g., a user utterance), on the first UI 703.

According to an embodiment, in screen 720, the display device 100 may display a second UI 705 (e.g., the second UI 320*a* in FIG. 3) for displaying a feedback on the first user input, on a screen on which the image 701 of content is displayed. According to an embodiment, the display device 100 may display a feedback 705*a* including an app capable of being selected based on the first user input, on the second UI 705. According to an embodiment, the display device 100 may display a text 703*c* corresponding to the reply of "What app is it?" to the first user input, on the first UI 703 and then may output the reply through a speaker. According to an embodiment, the display device 100 may display the indicator 703*a* for indicating a state of outputting the reply, on the first UI 703.

According to an embodiment, in screen 730, the display device 100 may receive a second user input called "CNN News" associated with the feedback. According to an embodiment, the display device 100 may display the indicator 703*a* indicating the state of receiving the second user input and a text 703*d* corresponding to the second user input (e.g., a user utterance), on the first UI 703.

According to an embodiment, in screen 740, the display device 100 may output an image 707 of content of "CNN news" corresponding to the second user input. Accordingly, the display device 100 may execute an app (e.g., CNN news app) desired by a user.

Figure 8:
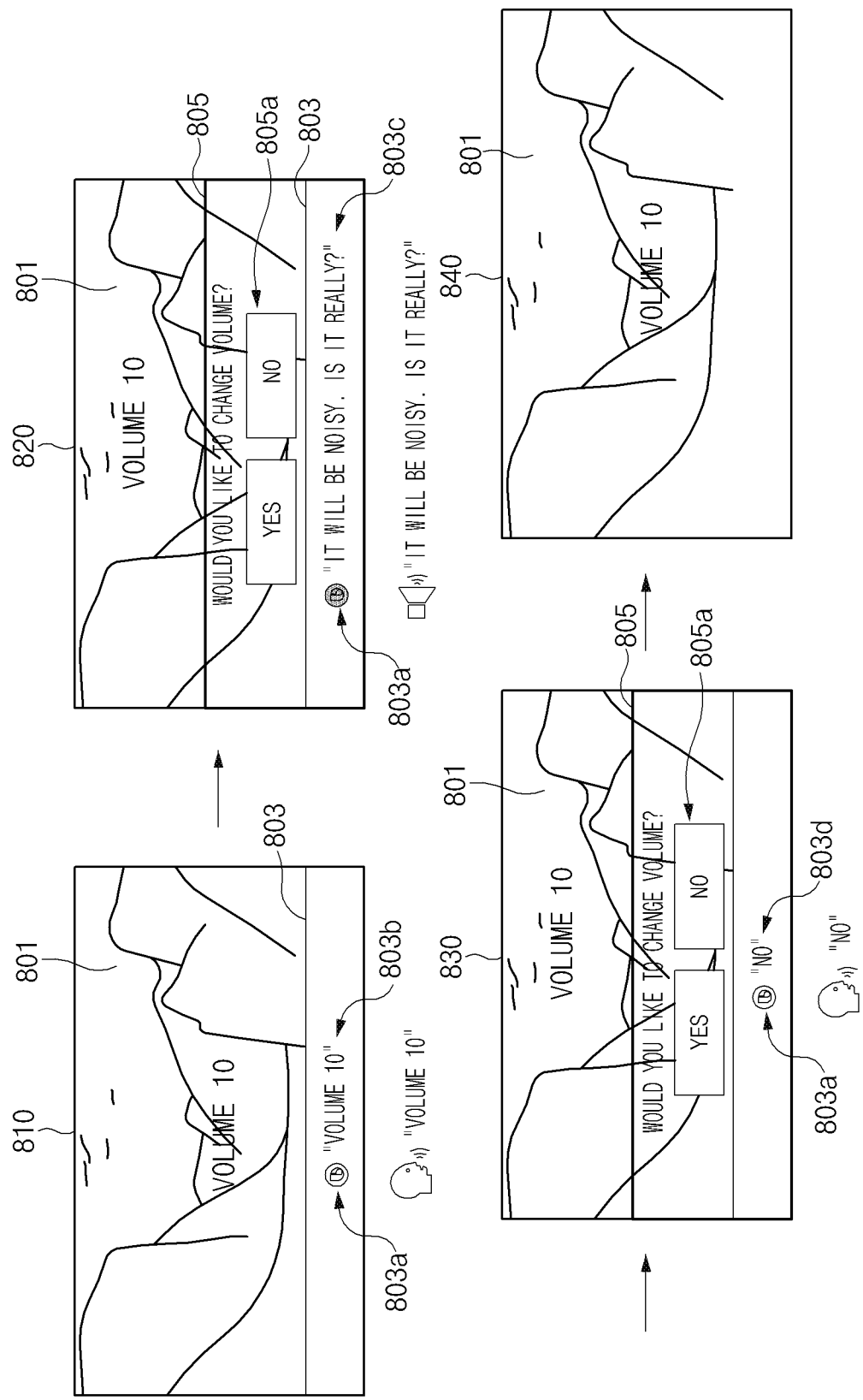
FIG. 8 illustrates a screen, on which a volume according to a user utterance of a display device is changed, according to an embodiment.

FIG. 8 illustrates a screen, on which a volume according to a user utterance of a display device is changed, according to an embodiment.

Referring to FIG. 8, the display device 100 may prevent a volume from being changed beyond a specified size depending on a user utterance for changing the volume.

According to an embodiment, in screen 810, the display device 100 may receive the first user input for changing the volume of "Volume 10". The first user input may include, for example, information enough to perform an operation of changing the volume but may include a request for changing the volume of the display device 100 to a specified magnitude (e.g., 50) or more. According to an embodiment, the display device 100 may display a first UI 803 (e.g., the first UI 310*a* in FIG. 3) for interacting with a user, on a screen on which an image 801 of content (e.g., the image 340*a* in FIG. 3) is displayed. According to an embodiment, the display device 100 may display an indicator 803*a* indicating the state of receiving the first user input and a text 803*b* corresponding to the first user input (e.g., a user utterance), on the first UI 803.

According to an embodiment, in screen 820, the display device 100 may display a second UI 805 (e.g., the second UI 320*a* in FIG. 3) for displaying a feedback on the first user input, on a screen on which the image 801 of content is displayed. According to an embodiment, the display device 100 may display a feedback 805*a* for identifying a change in volume based on the first user input, on the second UI 805. According to an embodiment, the display device 100 may display a text 803*c* corresponding to the reply of "It will be noisy. Is it really?" to the first user input, on the first UI 803 and then may output the reply through a speaker. According to an embodiment, the display device 100 may display the indicator 803*a* for indicating a state of outputting the reply, on the first UI 803.

According to an embodiment, in screen 830, the display device 100 may receive a second user input called "No" associated with the feedback 805*a*. According to an embodiment, the display device 100 may display the indicator 803*a* indicating the state of receiving the second user input and the text 803*d* corresponding to the second user utterance (e.g., a user utterance).

According to an embodiment, in screen 840, the display device 100 may not change the sound depending on the second user input.

Figure 9:
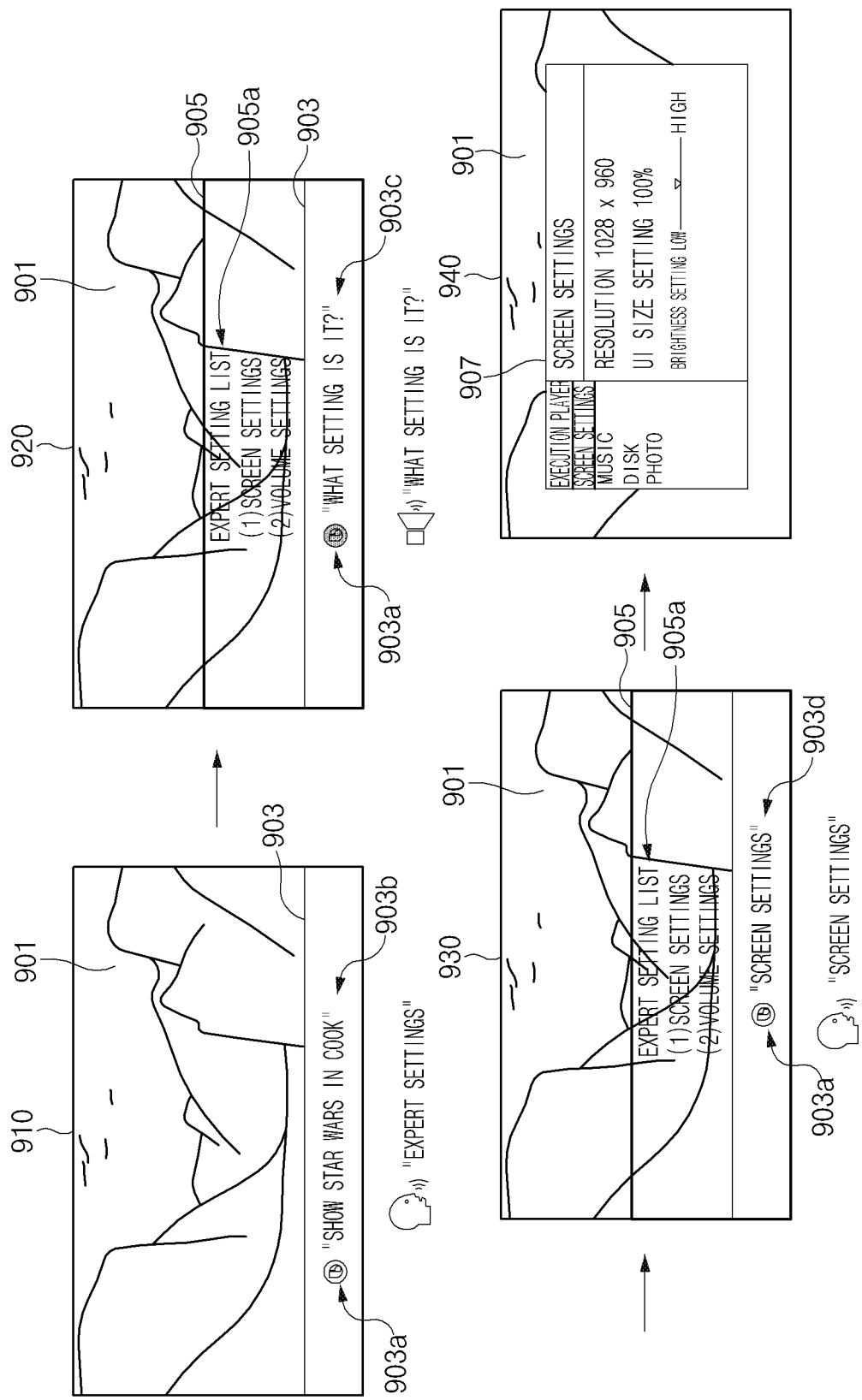
FIG. 9 is a screen on which an option menu is displayed on a display depending on a user utterance of a display device, according to an embodiment.

FIG. 9 is a screen on which an option menu is displayed on a display depending on a user utterance of a display device, according to an embodiment.

Referring to FIG. 9, the display device 100 may change the specified option by displaying an option menu on the display depending on a user utterance.

According to an embodiment, in screen 910, the display device 100 may receive a first user input for displaying the option menu called "expert settings". For example, the first user input may include information insufficient to specify the option menu. According to an embodiment, the display device 100 may display a first UI 903 (e.g., the first UI 310*a* in FIG. 3) for interacting with a user, on a screen on which an image 901 of content (e.g., the image 340*a* in FIG. 3) is displayed. According to an embodiment, the display device 100 may display an indicator 903*a* indicating the state of receiving the first user input and a text 903*b* corresponding to the first user input (e.g., a user utterance), on the first UI 903.

According to an embodiment, in screen 920, the display device 100 may display a second UI 905 (e.g., the second UI 320*a* in FIG. 3) for displaying a feedback on the first user input, on a screen on which the image 901 of content is displayed. According to an embodiment, the display device 100 may display a feedback 905*a* including an option capable of being selected based on the first user input, on the second UI 905. According to an embodiment, the display device 100 may display a text 903*c* corresponding to the reply of "What setting is it?" to the first user input, on the first UI 903 and then may output the reply through a speaker. According to an embodiment, the display device 100 may display the indicator 903*a* for indicating a state of outputting the reply, on the first UI 903.

According to an embodiment, in screen 930, the display device 100 may receive a second user input called "screen settings" associated with the feedback 905a. According to an embodiment, the display device 100 may display the indicator 903a indicating the state of receiving the second user input and a text corresponding to the second user utterance (e.g., a user utterance).

According to an embodiment, in screen 940, the display device 100 may display a screen setting menu 907 corresponding to the second user input on a screen on which an image 901 of content is displayed.

Figure 10:
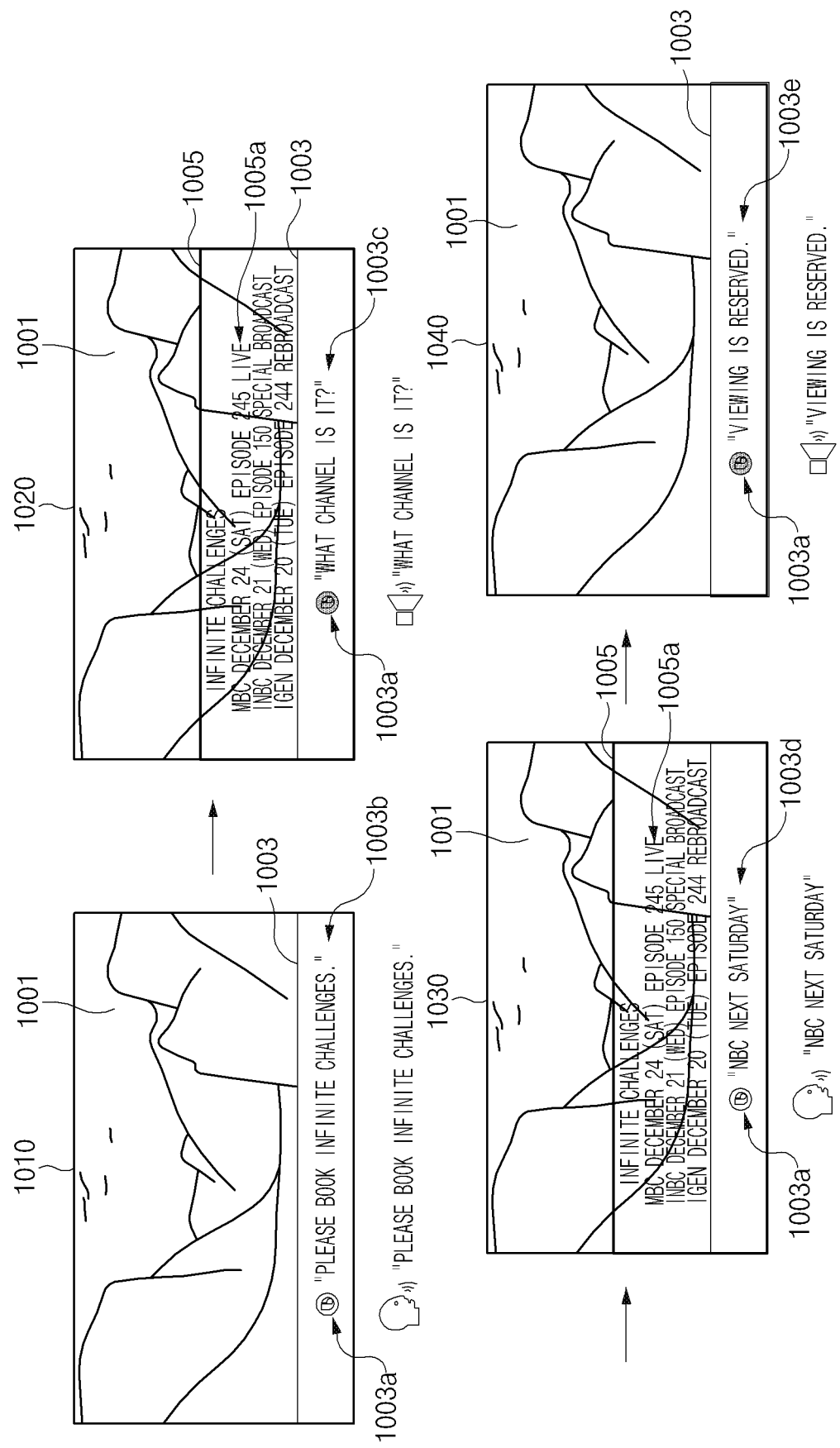
FIG. 10 is a screen on which a display device makes a viewing reservation depending on a user utterance, according to an embodiment.

FIG. 10 is a screen on which a display device makes a viewing reservation depending on a user utterance, according to an embodiment.

Referring to FIG. 10, the display device 100 may perform an operation for a viewing reservation depending on a user utterance.

According to an embodiment, in screen 1010, the display device 100 may receive a first user input for making a viewing reservation saying that "Please book infinite challenges". For example, the first user input may include information insufficient to reserve for viewing. According to an embodiment, the display device 100 may display a first UI 1003 (e.g., the first UI 310a in FIG. 3) for interacting with a user, on a screen on which an image 1001 of content (e.g., the image 340a in FIG. 3) is displayed. According to an embodiment, the display device 100 may display an indicator 1003a indicating the state of receiving the first user input and a text 1003b corresponding to the first user input (e.g., a user utterance), on the first UI 1003.

According to an embodiment, in screen 1020, the display device 100 may display a second UI 1005 (e.g., the second UI 320a in FIG. 3) for displaying a feedback on the first user input, on a screen on which the image 1001 of content is displayed. According to an embodiment, the display device 100 may output a feedback 1005a including channel information capable of being reserved for viewing based on the first user input, on the second UI 1005. According to an embodiment, the display device 100 may display a text 1003c corresponding to the reply of "What channel is it?" to the first user input, on the first UI 1003 and then may output the reply through a speaker. According to an embodiment, the display device 100 may display the indicator 1003a for indicating a state of outputting the reply, on the first UI 1003.

According to an embodiment, in screen 1030, the display device 100 may receive a second user input called "NBC next Saturday" associated with the feedback 1005a. According to an embodiment, the display device 100 may display the indicator 1003a indicating the state of receiving the second user input and a text 1003d corresponding to the second user input (e.g., a user utterance), on the first UI 1003.

According to an embodiment, in screen 1040, when completing the viewing reservation corresponding to the second user input, the display device 100 may display a message saying that "viewing is reserved" on the second UI 1005 and may output the message through a speaker.

Figure 11:
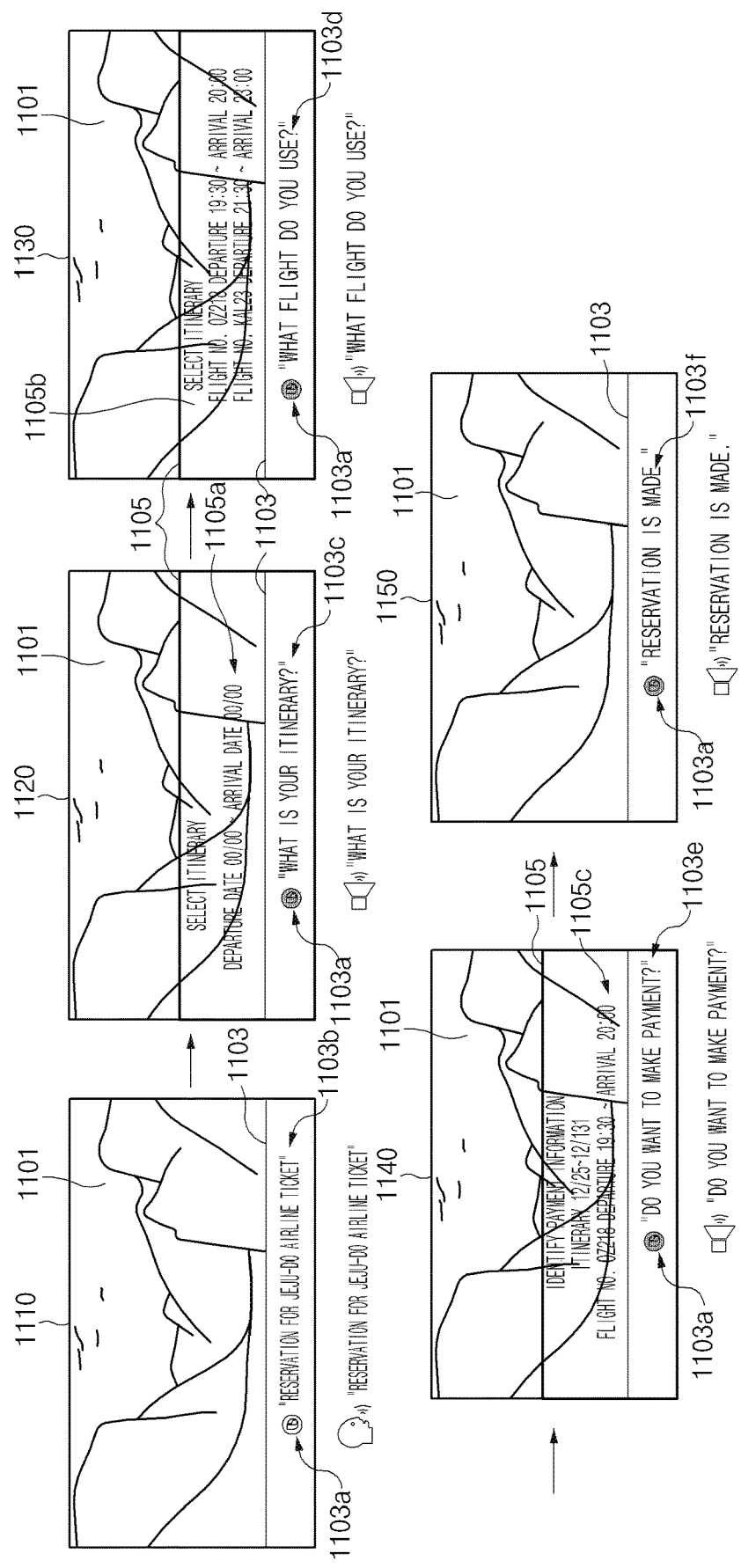
FIG. 11 is a screen on which a display device reserves an airline ticket depending on a user utterance, according to an embodiment.

FIG. 11 is a screen on which a display device reserves an airline ticket depending on a user utterance, according to an embodiment.

Referring to FIG. 11, the display device 100 may perform an operation of reserving an airline ticket depending on a user utterance.

According to an embodiment, in screen 1110, the display device 100 may receive a first user input for reserving an airline ticket, which is called the "reservation for Jeju-do airline ticket". For example, the first user input may include information insufficient to reserve. According to an embodiment, the display device 100 may display a first UI 1103 (e.g., the first UI 310a in FIG. 3) for interacting with a user, on a screen on which an image 1101 of content (e.g., the image 340a in FIG. 3) is displayed. According to an embodiment, the display device 100 may display an indicator 1103a indicating the state of receiving the first user input and a text 1103b corresponding to the first user input (e.g., a user utterance), on the first UI 1103.

According to an embodiment, in screen 1120, the display device 100 may display a second UI 1105 (e.g., the second UI 320a in FIG. 3) for displaying a feedback on the first user input, on a screen on which the image 1101 of content is displayed. According to an embodiment, the display device 100 may output a first feedback 1105a for making a request for an itinerary input based on the first user input on the second UI 1105. According to an embodiment, the display device 100 may display a text 1103c corresponding to "What is your itinerary?" for the first user input, on the first UI 1103 and then may output the reply through a speaker. According to an embodiment, the display device 100 may display the indicator 1103a for indicating a state of outputting the reply, on the first UI 1103. According to an embodiment, the display device 100 may receive a second user input including information about itineraries.

According to an embodiment, in screen 1130, the display device 100 may output a second feedback 1105b including an airline ticket capable of being selected based on the second user input on the second UI 1105. According to an embodiment, the display device 100 may display the text 1103d corresponding to the reply of "What flight do you use?" to the second user input, on the first UI 1103 and then may output the reply through a speaker. According to an embodiment, the display device 100 may receive a third user input to select an airline ticket.

According to an embodiment, in screen 1140, the display device 100 may output a third feedback 1105e including a request for identifying a payment based on the third user input. According to an embodiment, the display device 100 may display the text 1103e corresponding to the reply of "Do you want to make a payment?" to the third user input, on the first UI 1103 and then may output the reply through a speaker. According to an embodiment, the display device 100 may receive a fourth user input to identifying a payment.

According to an embodiment, in screen 1150, when completing the airline ticket reservation corresponding to the fourth user input, the display device 100 may display a text 1103f corresponding to a message saying that "airline ticket is reserved" on the second UI 1105 and may output the message through a speaker.

Figure 12:
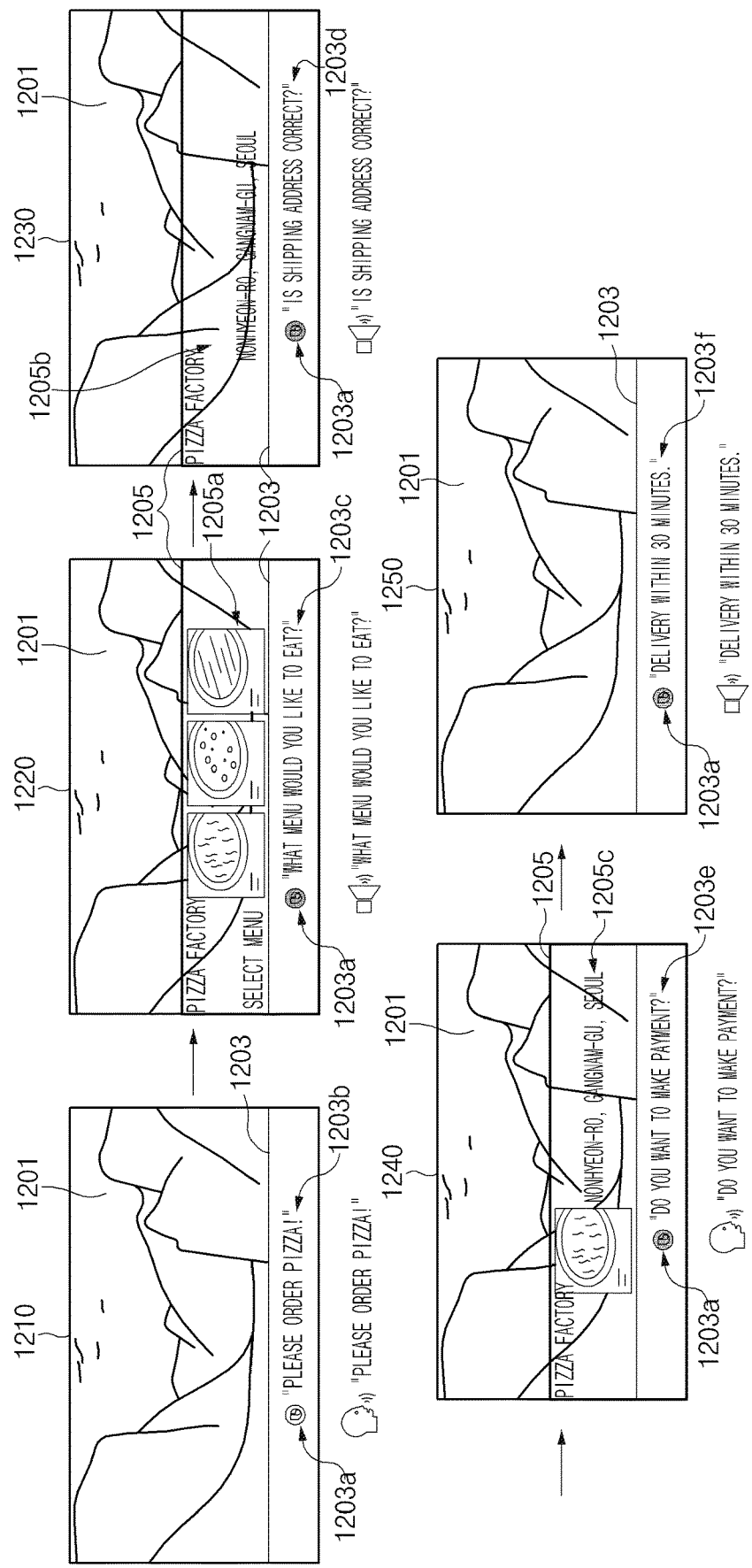
FIG. 12 is a screen on which a display device orders food depending on a user utterance, according to an embodiment.

FIG. 12 is a screen on which a display device orders food depending on a user utterance, according to an embodiment.

Referring to FIG. 12, the display device 100 may perform an operation of ordering food depending on a user utterance.

According to an embodiment, in screen 1210, the display device 100 may receive the first user input for ordering the food saying that "Please order pizza!". For example, the first user input may include information insufficient to order food. According to an embodiment, the display device 100 may display a first UI 1203 (e.g., the first UI 310a in FIG. 3) for interacting with a user, on a screen on which an image 1201 of content (e.g., the image 340a in FIG. 3) is displayed. According to an embodiment, the display device 100 may display an indicator 1203a indicating the state of receiving the first user input and a text 1203b corresponding to the first user input (e.g., a user utterance), on the first UI 1203.

According to an embodiment, in screen 1220, the display device 100 may display a second UI 1205 (e.g., the second UI 320*a* in FIG. 3) for displaying a feedback on the first user input, on a screen on which the image 1201 of content is displayed. According to an embodiment, the display device 100 may output a first feedback 1205*a* including a food menu on the second UI 1105 based on the first user input. According to an embodiment, the display device 100 may display a text 1203*c* corresponding to the reply of "What menu would you like to eat?" to the first user input, on the first UI 1103 and then may output the reply through a speaker. According to an embodiment, the display device 100 may display the indicator 1203*a* for indicating a state of outputting the reply, on the first UI 1203. According to an embodiment, the display device 100 may receive a second user input to select a menu.

According to an embodiment, in screen 1230, the display device 100 may output a second feedback 1205*b* for identifying a shipping address based on the second user input on the second UI 1105. According to an embodiment, the display device 100 may display the text 1203*d* corresponding to the reply of "Is the shipping address correct?" to the second user input, on the first UI 1203 and then may output the reply through a speaker. According to an embodiment, the display device 100 may receive a third user input to identify the shipping address.

According to an embodiment, in screen 1240, the display device 100 may output a third feedback 1205*c* including a request for identifying a payment based on the third user input. According to an embodiment, the display device 100 may display the text 1203*e* corresponding to the reply of "Do you want to make a payment?" to the third user input, on the first UI 1203 and then may output the reply through a speaker. According to an embodiment, the display device 100 may receive a fourth user input to identifying a payment.

According to an embodiment, in screen 1250, when completing the food order corresponding to the fourth user input, the display device 100 may display a message saying that "Delivery within 30 minutes" on the second UI 1205 and may output the message through a speaker. Accordingly, the display device 100 may perform an operation of ordering the food desired by the user.

Figure 13:
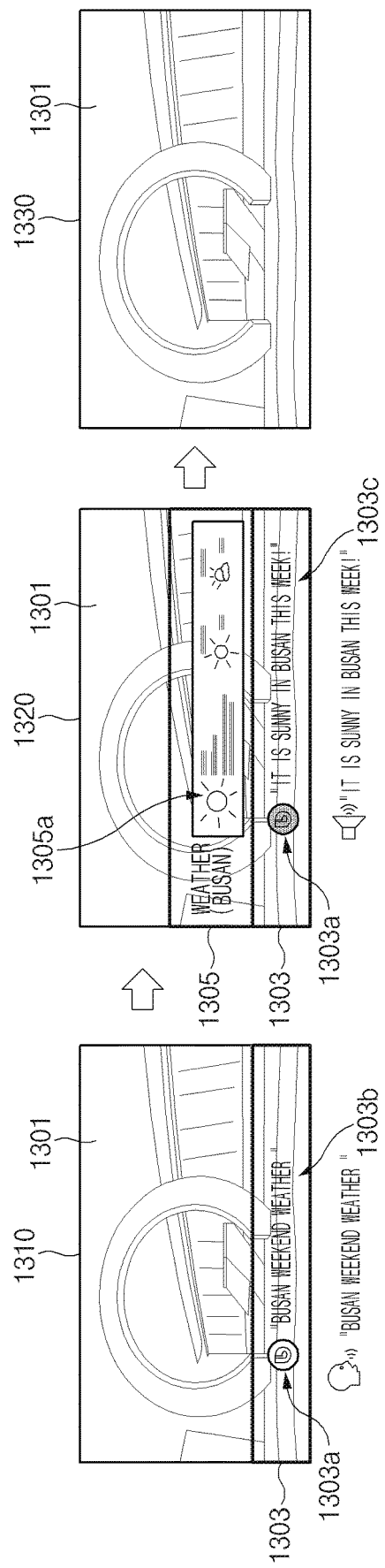
FIG. 13 is a screen on which a display device displays weather information depending on a user utterance, according to an embodiment.

FIG. 13 is a screen on which a display device displays weather information depending on a user utterance, according to an embodiment.

Referring to FIG. 13, the display device 100 may provide a user with information associated with the content image displayed on a display, depending on a user utterance.

According to an embodiment, in screen 1310, the display device 100 may receive a first user input for providing weather information called "Busan weekend weather". For example, the first user input may include a request for information associated with an image 1301 of content displayed on the display. According to an embodiment, the display device 100 may display a first UI 1303 (e.g., the first UI 310*a* in FIG. 3) for interacting with a user, on a screen on which the image 1301 of content (e.g., the image 340*a* in FIG. 3) is displayed. According to an embodiment, the display device 100 may display an indicator 1303*a* indicating the state of receiving the first user input and a text 1303*b* corresponding to the first user input (e.g., a user utterance), on the first UI 1303.

According to an embodiment, in screen 1320, the display device 100 may display a third UI 1305 (e.g., the third UI 330*a* in FIG. 3) for displaying the result of the first user input, on a screen on which the image 1301 of content is displayed. For example, the third UI 1305 may be displayed on the third layer (e.g., the third layer 330 of FIG. 3). According to an embodiment, the display device 100 may display information 1305*a* about Busan weather based on the first user input on the third UI 1305. According to an embodiment, the display device 100 may display a text 1303*c* for the reply of "it is sunny in Busan this week!" to the first user input, on the first UI 1303 and then may output the reply through a speaker. According to an embodiment, the display device 100 may display the indicator 1303*a* for indicating a state of outputting the reply, on the first UI 1303.

According to an embodiment, in screen 1330, when completing the provision of information corresponding to the first user input, the display device 100 may display only the image 1301 of content on the display.

Figure 14:
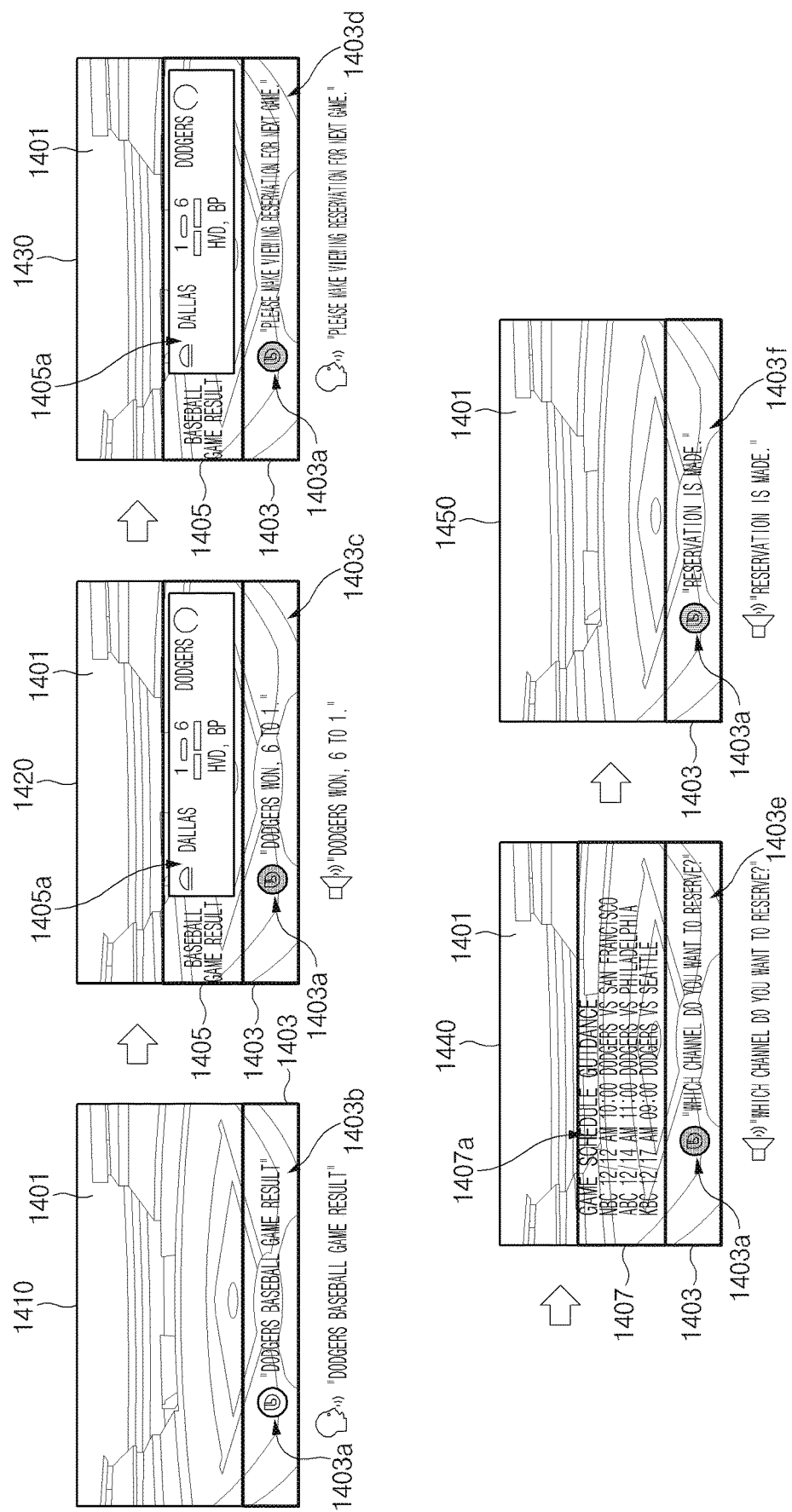
FIG. 14 is a screen on which a display device provides specified information and then makes a viewing reservation depending on a user utterance, according to an embodiment.

FIG. 14 is a screen on which a display device provides specified information and then makes a viewing reservation depending on a user utterance, according to an embodiment.

Referring to FIG. 14, the display device 100 may perform an operation of providing game result information and an operation of making viewing reservations.

According to an embodiment, in screen 1410, the display device 100 may receive a first user input for receiving game information called "dodgers baseball game result". According to an embodiment, the display device 100 may display a first UI 1403 (e.g., the first UI 310*a* in FIG. 3) for interacting with a user, on a screen on which an image 1401 of content (e.g., the image 340*a* in FIG. 3) is displayed. According to an embodiment, the display device 100 may display an indicator 1403*a* indicating the state of receiving the first user input and a text 1403*b* corresponding to the first user input (e.g., a user utterance), on the first UI 1403.

According to an embodiment, in screen 1420, the display device 100 may display a third UI 1405 (e.g., the third UI 330*a* in FIG. 3) for displaying the result of the first user input, on a screen on which the image 1401 of content is displayed. According to an embodiment, the display device 100 may output a result 1405*a* for providing game information on the third UI 1405 based on the first user input. According to an embodiment, a text 1403*c* for the reply saying that "Dodgers won, 6 to 1" to the first user input may be displayed on the first UI 1403, and the reply may be output through a speaker. According to an embodiment, the display device 100 may display the indicator 1403*a* for indicating a state of outputting the reply, on the first UI 1403.

According to an embodiment, in screen 1430, the display device 100 may receive a second user input for making a viewing reservation saying that "Please making a viewing reservation for the next game". For example, the second user input may include information insufficient to perform an operation of viewing reservation. According to an embodiment, the display device 100 may display a text 1403*d* corresponding to the second user input (e.g., a user utterance), on the first UI 1403.

According to an embodiment, in screen 1440, the display device 100 may display a second UI 1407 (e.g., the second UI 320*a* in FIG. 3) for displaying a feedback on the first user input, on a screen on which the image 1401 of content is displayed. According to an embodiment, the display device 100 may display a feedback 1407*a* including game information based on the first user input, on the second UI 1407. According to an embodiment, the display device 100 may display the reply saying that "Which channel do you want to reserve?" to the second user input, on the first UI 1403 and then may output the reply through a speaker. According to an embodiment, the display device 100 may receive a third user input associated with game selection.

According to an embodiment, in screen 1450, when completing the reservation for viewing a game corresponding to the second user input, the display device 100 may display a message saying that "Reservation is completed" on the second UI 1403 and may output the message through a speaker.

In a process of performing the specified function depending on a user utterance, the display device 100 of the invention described with reference to FIGS. 1 to 14 may display a UI for interacting with a user on a display and may display a UI for displaying the result of performing the specified operation to overlap with a part of the image of content, thereby providing a user experience (UE) that performs the specified function in a dialog form while minimizing the obscuration of the image of the content.

According to various embodiments, at least a part of an apparatus (e.g., modules or functions thereof) or a method (e.g., operations) may be, for example, implemented by instructions stored in a computer-readable storage media in the form of a program module. The instruction, when executed by a processor, may cause the processor to perform a function corresponding to the instruction. The computer-readable recording medium may include a hard disk, a floppy disk, a magnetic media (e.g., a magnetic tape), an optical medium (e.g., a compact disc read only memory (CD-ROM) and a digital versatile disc (DVD), a magneto-optical media (e.g., a floptical disk)), an embedded memory, or the like. The one or more instructions may contain a code made by a compiler or a code executable by an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A display device comprising:
   a microphone;
   a display configured to display a screen including a plurality of layers;
   a memory configured to store a plurality of application programs; and
   at least one processor configured to:
      display an image on a first layer among the plurality of layers;
      based on a first voice input being received while the image is displayed, display a first user interface (UI) for an interaction with a user on a second layer among the plurality of layers in a state in which the second layer overlaps the first layer;
      display a second UI for displaying a result of processing the first voice input on a third layer among the plurality of layers in a state in which the third layer overlaps the first layer, wherein the second UI comprises a plurality of items being obtained by processing the first voice input;
      display a third UI for requesting a feedback to select an object from among the plurality of items which is obtained as the result of processing the first voice input on the second layer; and
      based on a second voice input associated with the feedback, execute at least one application program associated with an item corresponding to the second voice input among the plurality of items,
   wherein each of the second layer and the third layer overlaps the first layer to display the image on the first layer with a specified transparency, and
   wherein the second UI is not overlapped with the third UI.

2. The display device of claim 1, wherein the processor is configured to:
   receive the first voice input through the microphone; and
   display a text corresponding to the first voice input on the first UI and the first layer.

3. The display device of claim 1, wherein the processor is configured to:
   selectively display one of the second UI and the third UI on the display.

4. The display device of claim 1, further comprising:
   a speaker,
   wherein the processor is configured to:
      request the feedback through the speaker.

5. The display device of claim 1, wherein the first UI includes an indicator for displaying a state of the display device, and
   wherein the processor is configured to:
      while the first voice input is received, display the indicator in a first state; and
      while the plurality of items is displayed, display the indicator in a second state.

6. The display device of claim 1, wherein the processor is configured to:
   display a fourth UI comprising information associated with the executed application program on the first layer.

7. The display device of claim 1, wherein the processor is configured to:
   process the first voice input through an external server processing a user utterance.

8. A control method of a display device, the method comprising:
   displaying an image on a first layer among a plurality of layers included in a screen displayed on a display;
   based on a first voice input being received while the image is displayed, displaying a first UI for an interaction with a user on a second layer among the plurality of layers in a state in which the second layer overlaps the first layer;
   displaying a second UI for displaying a result of processing the first voice input on a third layer among the plurality of layers in a state in which the third layer overlaps the first layer, wherein the second UI comprises a plurality of items being obtained by processing the first voice input;
   displaying a third UI for requesting a feedback to select an object from among the plurality of items which is obtained as a result of processing the first voice input on the second layer; and
   based on a second voice input associated with the feedback, executing at least one application program associated with an item corresponding to the second voice input among the plurality of items,
   wherein each of the second layer and the third layer overlaps the first layer to display the image on the first layer with a specified transparency, and
   wherein the second UI is not overlapped with the third UI.

9. The method of claim 8, further comprising:
   receiving a second voice input associated with the feedback through a microphone; and
   displaying a text corresponding to the second voice input on the first UI and the first layer.

10. The method of claim 8, further comprising:
    requesting the feedback through a speaker.

11. The method of claim 9, wherein the first UI includes an indicator for displaying a state of the display device, and the method further comprises:
    while the first voice input is received, displaying the indicator in a first state; and
    while the plurality of items are displayed, displaying the indicator in a second state.

12. The method of claim 8, further comprising:
    displaying a fourth UI comprising information associated with the executed application program on the first layer.

* * * * *